April 28, 1959 R. W. DEICHERT 2,884,484

GAMMA CORRECTION AMPLIFIER

Filed May 7, 1956 2 Sheets-Sheet 1

INVENTOR.
ROBERT WILLIAM DEICHERT
BY Darby & Darby
ATTORNEYS

GAMMA CORRECTION AMPLIFIER

Filed May 7, 1956 2 Sheets-Sheet 2

INVENTOR.
ROBERT WILLIAM DEICHERT
BY Darby & Darby
ATTORNEYS

United States Patent Office 2,884,484
Patented Apr. 28, 1959

2,884,484

GAMMA CORRECTION AMPLIFIER

Robert William Deichert, Jersey City, N.J., assignor to Allen B. Du Mont Laboratories, Inc., Clifton, N.J., a corporation of Delaware Application May 7, 1956, Serial No. 583,299
3 Claims. (Cl. 178—5.4)

This invention relates to amplifier circuits known in the television art as gamma correction amplifiers.

In every amplifier circuit there is a relation between the amplitude of the input signal and the amplitude of the output signal. This relation is called the transfer characteristic, and in the usual amplifier is linear, i.e., if the amplitude of the input signal is doubled, the amplitude of the output signal will also be doubled. When doubling the amplitude of the input signal produces an output signal which is disproportionately larger or smaller, the response of the amplifier is non-linear. If, for example, when the input signal to an amplifier is doubled in amplitude, the output signal from the amplifier is tripled in amplitude, the amplifier is said to be an expansion amplifier. On the other hand, if, when the input signal to an amplifier is doubled, the output signal is less than doubled, the amplifier is said to be a compression amplifier. The transfer characteristics of gamma correction amplifiers, as well as correlative amplifiers used in other electronic arts, are frequently non-linear.

The term "gamma" derives from its use in photography, and in television expresses the relation between the light emitted by the cathode ray viewing tube and the amplitude of electrical signal applied to the tube. As is well known in the television art, it is a characteristic of the light emitting phosphors used in cathode ray tubes that if the input signal amplitude is doubled, the light output will be more than doubled. This effect tends to make a picture appear somewhat like a silhouette, either black or white with no shading of gray between.

While this silhouette effect is a serious problem in black and white television, it is even more so in color television because it distorts the color values of the image reproduced on the cathode ray tube out of all comparison to the original scene. In order to produce a pleasing picture and to reproduce a large number of shades of gray, a gamma correction amplifier is introduced into the television signal path to pre-distort the television signal in a way which is the converse of the distortion inherent in the phosphors.

One of the objects of the present invention is to provide an improved non-linear amplifier with either an expansion or a compression characteristic.

A more specific object is to produce an improved correction amplifier for television and particularly for color television.

These objects and others will become apparent during the explanation which will be offered in conjunction with the drawings, of which;

Figure 1:
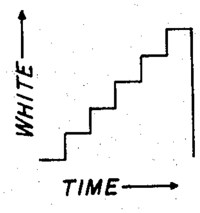
Fig. 1 is a waveform depicting a so-called gray scale.
Figure 3:
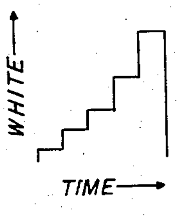
Figure 4:
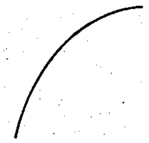
Figure 5:
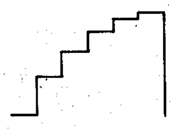
Figure 6:
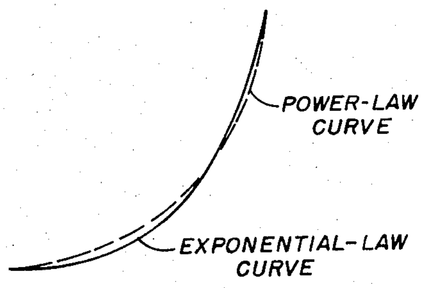
Figure 7:
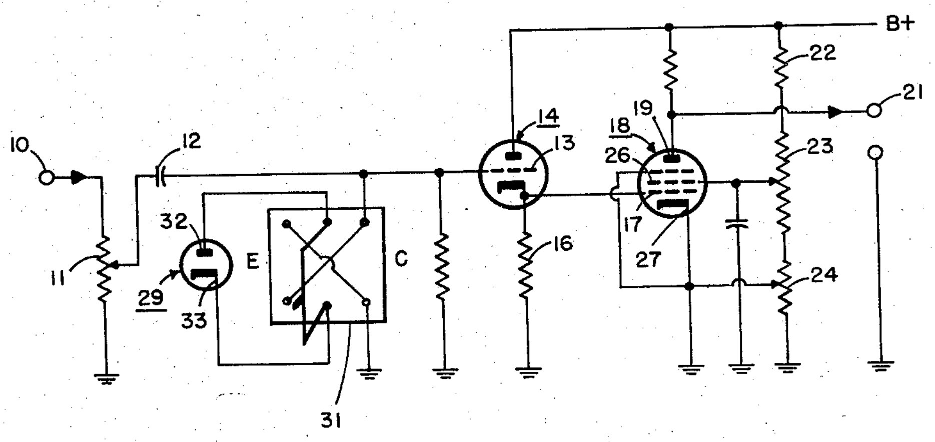
Figure 8:
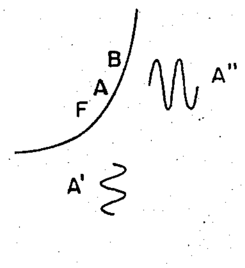
Figure 9:
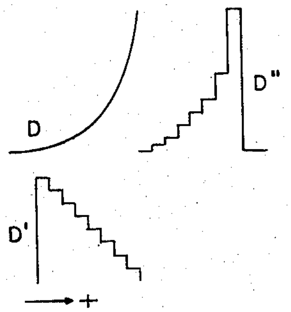
Figure 10:
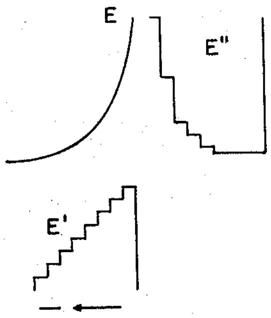
Figure 11:
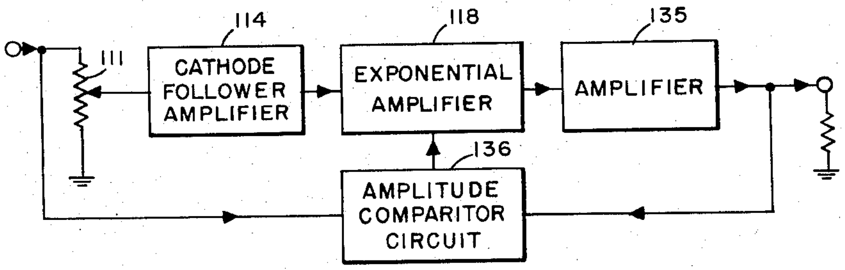

Fig. 3 indicates the inherent light output of a cathode ray tube for the input signal of Fig. 1;

Fig. 4 depicts the correction required;

Fig. 5 illustrates a pre-distorted input signal;

Fig. 6 equates comparable response curves;

Fig. 7 is a schematic representation of the circuit of the invention;

Figs. 8–10 show the response curves obtained through the use of the instant invention;

Fig. 11 illustrates an improved embodiment of the circuit in Fig. 7; and

Figure 12:
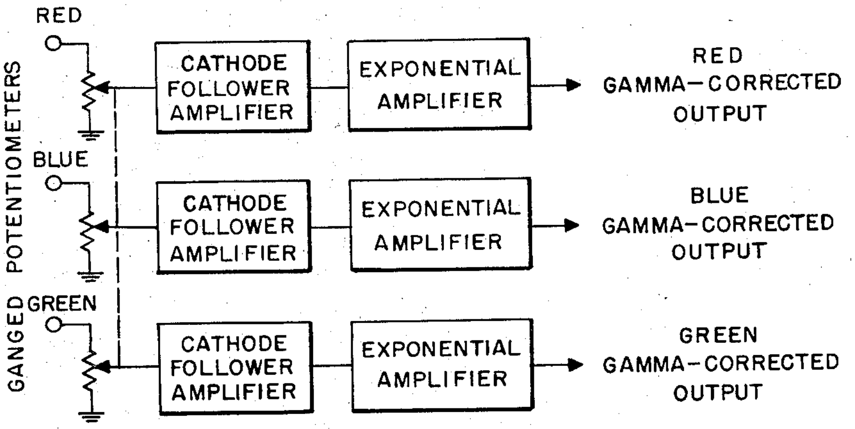

Fig. 12 illustrates the instant invention applied to color television.

Referring now to Fig. 1 there is shown the staircase waveform of a gray scale generator. All time intervals are equal, and each increase of amplitude is of the same magnitude, the values represented ranging from black through shades of gray to white.

Figure 2:
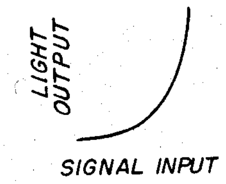
Fig. 2 shows the transfer characteristic of a cathode ray tube.

Fig. 2 depicts the light output of a cathode ray tube, such as may be used in television, as it is related to the input signal. It may be seen that this is a non-linear transfer characteristic, indicating that the light output increases more rapidly than the input signal; i.e., it shows an expansion characteristic. Experiments indicate that the response follows a "power-law" curve with the value 2.2 being the approximate gamma.

Mathematically this would be stated as:

$$Y=X^{2.2}$$

where Y represents the output, and X represents the input signal.

If now the signal of Fig. 1 were impressed on the tube whose response is shown in Fig. 2, the light output would appear as shown in Fig. 3. This response is unsatisfactory since the white portions are stretched, and the output is not a true representation of the input signal shown in Fig. 1. However, if the waveform of Fig. 1 were to be modified by a gamma corrector with the response shown in Fig. 4, the applied waveform would be pre-distorted as shown in Fig. 5. If this pre-distorted waveform were then impressed on the cathode ray tube, the output of the cathode ray tube would be an exact replica of the input signal of Fig. 1.

It is an interesting mathematical fact that if the previously described "power-law" curve ($Y=X^m$), and an "exponential-law" curve ($Y'=e^x$) are drawn, they may be caused to intersect at three points as shown in Fig. 6. Thus, while the power-law curve has a constant value of gamma (in this illustration 2.2), the average gamma for the exponential-law curve is also 2.2 (for this illustration). Over the range limited by the extreme points of intersection, the two curves are therefore substantially matched.

The instant invention contemplates the use of the above information to provide a novel gamma corrector amplifier having a response curve which is an exponential-law function, and may therefore be matched to a desired correcting, compensating, or pre-distorting curve. Thus, if the desired correction curve is a power-law function, it could be extremely closely approximated by the gamma corrector amplifier disclosed in this application. If the desired correction curve is a logarithmic curve function, which is a special case of an exponential curve, the same amplifier could be used. Further, if the required correction curve were an exponential-law function, the instant amplifier would also provide the correct response. Thus, a gamma correction amplifier with an exponential-law response curve would be universally useful.

Referring now to Fig. 7, there is shown a circuit for the instant invention, a gamma corrector whose output response curve is an exponential-law function. The signal to be corrected by either compression or expansion is applied to input terminal 10. A portion of this signal is taken from potentiometer 11, and fed through capacitor 12 to control grid 13 of electron tube 14. Since this tube is connected as a cathode follower, the output is obtained from the cathode load resistor 16, and is applied to the control grid 17 of electron tube 18 which operates as an exponential amplifier. This type of operation is obtained by operating the screen grid at a low voltage, generally at less than 10% of the anode potential, and frequently at less than 10 volts.

Anode 19 provides an inverted output signal which appears between output terminal 21 and ground as shown. A voltage divider comprising resistor 22 and potentiometers 23 and 24 is connected between B+ and ground, and this divider supplies the necessary potentials to the screen grid 26 and to cathode 27. Under these conditions of tube operation, fluctuations may occur in the current of the control grid 17, and it is therefore driven from the cathode follower tube 14 which offers a low impedance source. Since a low impedance provides a low R, the voltage drop ΔIR due to changes in grid current is minimized, and control grid 17 is at a substantially constant D.C. bias potential. Potentiometers 23 and 24 control the amplitude of the output signal, potentiometer 24 being the coarse adjustment, and control 23 being the fine adjustment. Further amplification may be obtained by applying the output obtained at terminal 21 to other amplifier stages in a manner well known in the art. Adjustment of potentiometer 11 changes the gamma, as described hereinafter in connection with Figs. 9 and 10, by determining the maximum excursion of the input signals.

The circuit as it has been thus far described, permits a type of operation known as "unclamped." This means that the grid bias potential of control grid 13 is substantially constant, and that a varying signal applied thereto is permitted to produce a grid swing to either side of this biasing potential.

Referring now to Fig. 8, there is shown the exponential response curve of the instant gamma corrector amplifier under unclamped operation. If the control grid 17 were biased to point A, and a sine wave grid signal A′ were applied, the output would be of the form shown at A″, and the instantaneous value Y″ of the output signal would conform to the mathematical hyperbolic function which may be expressed as:

$$Y''=\sinh x=\frac{e^{x}-e^{-x}}{2}$$

This response would be useful in computer circuits and is the direct result of unclamped operation as previously described.

Another mode of operation is known as "clamped." This is obtained, in Fig. 7, by connecting diode 29 between control grid 13 and cathode 16 through reversing switch 31. One characteristic of clamped operation is that it is possible to produce either signal expansion or signal compression. Switch position C produces compression by connecting the anode 32 of diode 29 to control grid 13, and the cathode 33 of the diode to ground. Switch position E reverses the diode connections and provides an expanded signal.

As shown in Fig. 8, for clamped compressive operation the action of diode 29 is to place an upper limit B on the excursion of the grid signal A; thus producing an output waveform whose instantaneous value is expressed mathematically as $e^{-x}$, the negative sign indicating compression.

Referring again to Fig. 7, clamped expansive operation is obtained when the reversing switch 31 is in the E position. The diode now imposes a lower limit F (Fig. 8) on the excursions of the grid signal, thus producing an output waveform whose mathematical description would be $e^{x}$, the positive sign denoting expansion.

The effect of reversing the signal polarity and the diode connections is masked in Fig. 8 due to the symmetry of the sine wave. However, reference to Figs. 9 and 10 illustrates quite markedly, the effect of this reversal.

In Fig. 9, the clamped operation is expansive, corresponding to clamp point D. The input waveform is shown as a positive going staircase waveform D′, and the output is an expanded staircase waveform D″. It may be seen that greater excursions of the input signal are more highly amplified.

Fig. 10 illustrates a clamped compressive operation using clamp point E. A negative going staircase waveform E′ is applied and a compressed signal E″ is obtained. It may be seen that the greater excursions are amplified to a lesser degree, thus producing a compressive effect.

While Figs. 9 and 10 show expansion and compression respectively, it will be noted that the overall output wave shapes tend to be complementary. This indicates that the value of gamma used in both cases were approximately equal, the difference in effect being obtained by reversing the polarity of the input signal and the diode connections.

It may thus be seen that several modes of operation are available. Firstly an unclamped operation, switch open, whose response is a hyperbolic function; and secondly, two clamped operations, switch in the E or the C position, whereupon the response curve becomes an exponential. Points A, B, F, D, and E correspond to the bias potential applied to control grid 13, and thus indicate the mode of operation of the amplifier to be unclamped, or either compressive or expansive.

Referring to Figs. 9 and 10, it will be seen that if the magnitude of the input signals D′ and E′ were decreased there would be less expansion or compression respectively. This would mean that effectively the value of gamma had been changed. Since the magnitude of the applied signal is controlled by the setting of potentiometer 11 in Fig. 7, this potentiometer may be called the "gamma control." However, referring again to Figs. 9 and 10, the reduced magnitude of input signals D′ and E′ would also reduce the amplitude of output signals D″ and E″. The amplitude of the output signals may, however, be controlled by adjusting potentiometers 23 and 24. It may thus be seen that adjustment of the gamma control 11 inherently alters the amplitude of the output signals whose amplitude, however, may be compensated by adjustment of the amplitude controls 23 and 24.

Referring now to Fig. 11 there is illustrated in block diagram form a practical circuit utilizing the automatic compensation of the instant invention just described. The signal to be corrected is impressed upon potentiometer 111. A portion of the signal is then applied through a cathode follower stage 114 to an exponential amplifier 118 as previously described. The output signal may be passed through further stages of amplification 135 in a manner well known in the art. A portion of the input signal, and a portion of the output signal are fed to an amplitude comparator unit 136, which may be a differential amplifier or some other suitable circuit. Thus, adjustment of the gamma control 111 causes a change in amplitude of the output signal which is then compared in the amplitude comparator unit with a sample of the input signal. Any difference develops a correction voltage which is fed to the screen grid of the exponential amplifier to reestablish the amplitude of the output signal. Thus a constant amplitude output signal may be obtained for any desired range of gamma.

As is known to those versed in the art, color television requires separate gamma corrector amplifiers for each of the three color channels, red, green, and blue. Thus, the staircase waveform D′ of Fig. 9 or E′ of Fig. 10 could represent a grey scale, although comprised of color signals. If the separate gamma corrector amplifiers used in each channel were not properly matched, the different shades of grey would be tinged with various colors depending upon the mismatch of the gamma amplifiers. The instant invention overcomes this problem by giving all the amplifiers similar response curves, and providing individual gamma controls.

Under some conditions it may be desirable to gang the various gamma controls. This need would arise, in television for example, if it were desired to compensate for a color film which had been prepared by use of an unusual value of gamma. Simultaneous gamma adjustment of the various channels would then be required. This circuitry is shown in block diagram form in Fig. 12.

It has been shown that the instant invention discloses a gamma corrector amplifier with several novel characteristics. Its response is an exponential law function which may be adjusted to compensate or correspond to the gamma of other elements, or to the response of other amplifiers. This holds true even if the gamma of the original element is a power function, an exponential function, a logarithmic function, or a hyperbolic function. The gamma of the corrector amplifier may be easily adjusted over a considerable range. A simple reversal of the input signal polarity and a diode permits either expansion or compression. A plurality of amplifiers may be matched for similarity of response as required for color television. The instant amplifier may be used at the source, for example a television studio, or at the receiver.

While the foregoing specification has been specifically described, I desire to be limited only by the following claims.

What is claimed is:

1. A gamma correction amplifier for color television, said amplifier comprising three electron tubes, each tube having a cathode, a control grid, a screen grid, and an anode; a first source of potential connected to said cathodes; a second source of potential connected to said anodes, the potential of said second source being positive with respect to said first source; a third source of potential connected to said screen grids, the potential of said third source being such as to make said screen grids positive with respect to said cathode by a relatively small amount compared to said anode, said amount being sufficient to cause each said electron tube to operate with a substantially exponential transfer characteristic; a fourth source of potential connected to said control grids to bias the control grids negative with respect to said cathodes; a first source of signal voltage corresponding to red components of a color television image; a second source of signal voltage corresponding to blue components of said television image; a third source of signal voltage corresponding to green components of said television image; a first, second, and third potentiometer connected to said signal sources respectively, to control the output signal amplitudes thereof; mechanical means interlocking said potentiometers to cause them to vary simultaneously; and first, second, and third low impedance connection circuits connecting respective output arms of said potentiometers to respective control grids of said tubes.

2. An automatically compensating gamma correction circuit comprising: a source of variable input signals; a cathode follower connected to said source to be energized thereby; an exponential amplifier having an exponential transfer characteristic connected to said cathode follower to be energized thereby; a linear amplifier having input and output terminals; a connection between the output of said exponential amplifier and said input terminal of said linear amplifier; a connection between said output terminal of said linear amplifier and a system output terminal; an amplitude comparator circuit having one input connected to said source, and having another input connected to said system output terminal whereby any changes in amplitude of the output signal at said system output terminal may be detected; a connection between the output of said comparator circuit and an input of said exponential amplifier whereby changes in the amplitude of said output signal modify the gain of said exponential amplifier.

3. A gamma correction circuit comprising: an electron tube having a cathode, a control grid, a screen grid, and an anode; means causing said electron tube to operate with a substantially exponential transfer characteristic, said means comprising a first source of potential connected to said cathode, a second source of potential connected to said anode, the potential of said second source being positive with respect to said first source, a third source of potential connected to said screen grid, the potential of said third source being such as to make said screen grid positive with respect to said cathode by a relatively small amount compared to said anode, a source of signal voltage; a potentiometer connected to said source, said potentiometer controlling the output signal amplitude thereof; a low impedance circuit connected between the output of said potentiometer and said control grid; a diode having a cathode and an anode; and a reversing switch connected to shunt said diode in a selectable polarity across said potentiometer output.

References Cited in the file of this patent

UNITED STATES PATENTS

| | | |
|---|---|---|
| 2,627,547 | Bedford | Feb. 3, 1953 |
| 2,646,463 | Schroeder | July 21, 1953 |

OTHER REFERENCES

Principles of Television Engineering, Fink, 1940, pages 204 to 206.